US012736348B2

(12) United States Patent
Nakamura et al.

(10) Patent No.: US 12,736,348 B2
(45) Date of Patent: Sep. 15, 2026

(54) ARRIVAL TIME CALCULATING DEVICE

(71) Applicant: NTT DOCOMO, INC., Chiyoda-ku (JP)

(72) Inventors: Yusuke Nakamura, Chiyoda-ku (JP); Tetsuya Yamaguchi, Chiyoda-ku (JP); Takuya Izumisawa, Chiyoda-ku (JP); Akinari Sakai, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 72 days.

(21) Appl. No.: 18/681,317

(22) PCT Filed: Aug. 24, 2022

(86) PCT No.: PCT/JP2022/031915
§ 371 (c)(1),
(2) Date: Feb. 5, 2024

(87) PCT Pub. No.: WO2023/053795
PCT Pub. Date: Apr. 6, 2023

(65) Prior Publication Data

US 2025/0146823 A1 May 8, 2025

(30) Foreign Application Priority Data

Oct. 1, 2021 (JP) ................................ 2021-162700

(51) Int. Cl.
*G01C 21/20* (2006.01)
*G01P 13/00* (2006.01)

(52) U.S. Cl.
CPC .............. *G01C 21/20* (2013.01); *G01P 13/00* (2013.01)

(58) Field of Classification Search
USPC .......................................................... 701/465
See application file for complete search history.

(56) References Cited

U.S. PATENT DOCUMENTS 6,161,097 A * 12/2000 Glass ..................... G08G 5/727 342/36
2014/0288821 A1 * 9/2014 Modica .................. G08G 1/127 701/465

(Continued)

FOREIGN PATENT DOCUMENTS

JP 2010-141556 A 6/2010

OTHER PUBLICATIONS

International Search Report mailed on Nov. 1, 2022 in PCT/JP2022/031915 filed on Aug. 24, 2022, 2 pages.

(Continued)

*Primary Examiner* — Navid Z. Mehdizadeh
*Assistant Examiner* — Sarah A. Mueller
(74) *Attorney, Agent, or Firm* — Oblon, McClelland, Maier & Neustadt, L.L.P.

(57) ABSTRACT

An arrival time determining device that can accurately estimate a timing of arrival at a predetermined position. A mobile terminal 100 includes at least a user motion determining unit 102, an estimated arrival time calculating unit 104, and an arrival time determining unit 105. The user motion determining unit 102 determines a user motion (a stopped state or a boarding state) based on motion sensor information of the mobile terminal 100. The estimated arrival time calculating unit 104 calculates a time (time A) at which the mobile terminal 100 has arrived at a destination as an estimated arrival time $t^{est}$ based on a position of the mobile terminal 100 and the user motion (when the user is in the stopped state). The arrival time determining unit 105 determines the estimated arrival time $t^{est}$ as a result arrival time $t^{res}$ based on the user motion (when the user is in the boarding state). The result arrival time $t^{res}$ is used to next calculate the estimated arrival time $t^{est}$.

5 Claims, 8 Drawing Sheets

(56) References Cited

U.S. PATENT DOCUMENTS

2016/0029156 A1* 1/2016 Cheng .................. H04W 4/024
701/465
2024/0167838 A1* 5/2024 Tokutake .............. G09G 5/377

OTHER PUBLICATIONS

International Preliminary Report on Patentability and Written Opinion issued Apr. 11, 2024 in PCT/JP2022/031915, 5 pages.

* cited by examiner

| USER ID | CHECK-IN TIME T | DIFFERENCE D [sec] | ESTIMATE ARRIVAL TIME $t^{est}$ | RESULT ARRIVAL TIME $t^{res}$ |
|---|---|---|---|---|
| xxxyyyzzz | 2021/07/28T08:27:50 | 50 | 2021/07/28T08:30:20 | 2021/07/28T08:30:20 |
| xxxyyyzzz | . . . | 48 | . . . | . . . |
| xxxyyyzzz | . . . | 51 | . . . | . . . |
| . . . | . . . | . . . | . . . | . . . |
| aaabbbccc | 2021/07/28T09:00:21 | 50 | 22021/07/28T09:02:10 | – |
| aaabbbccc | . . . | . . . | . . . | . . . |
| . . . | . . . | . . . | . . . | . . . |

(b)

| USER ID | SET VALUE y |
|---|---|
| xxxyyyzzz | 50 |
| aaabbbccc | 55 |

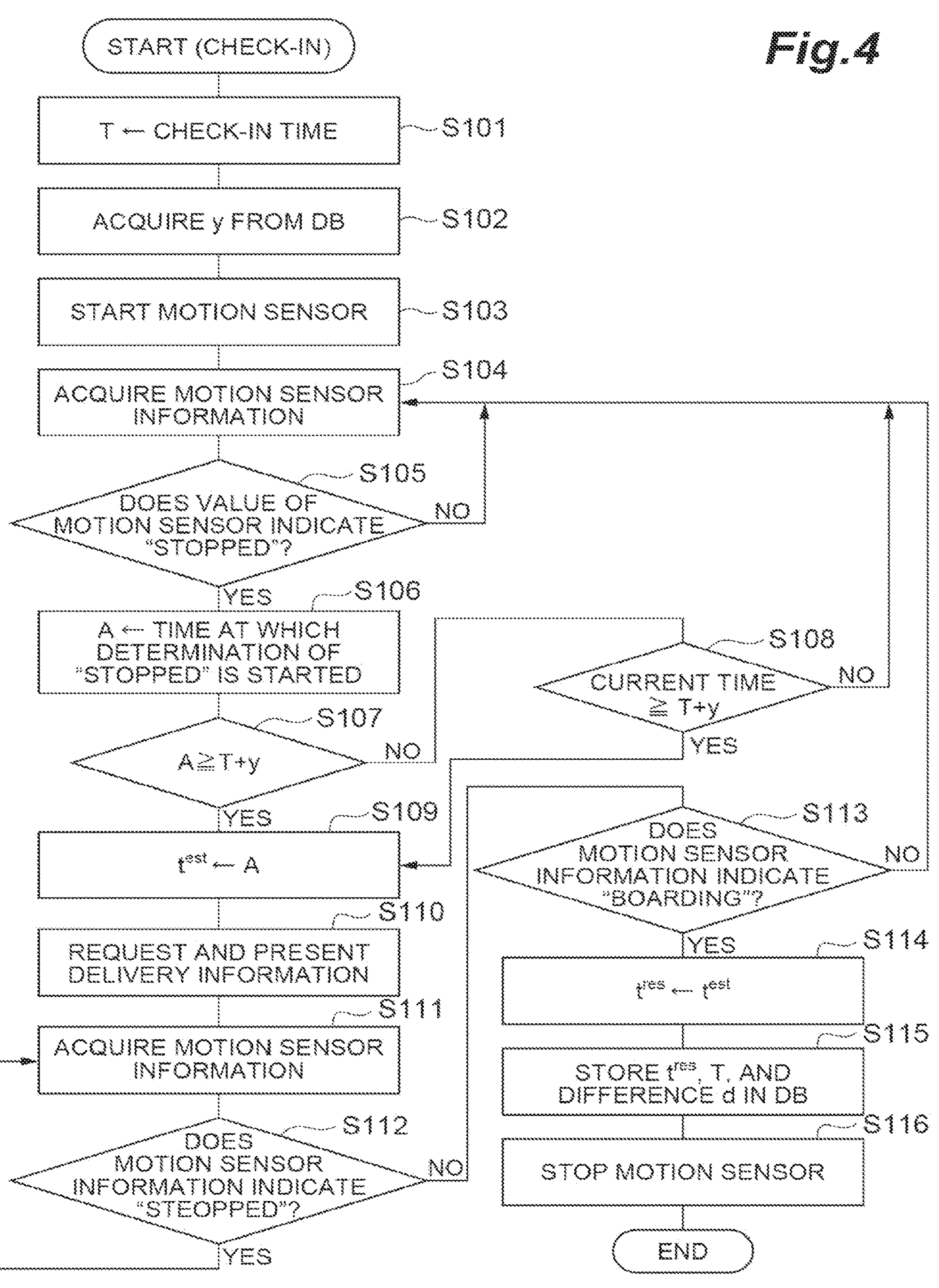

Fig.4
START (CHECK-IN)
T ← CHECK-IN TIME
S101
ACQUIRE y FROM DB
S102
START MOTION SENSOR
S103
ACQUIRE MOTION SENSOR INFORMATION
S104
DOES VALUE OF MOTION SENSOR INDICATE "STOPPED"?
S105
NO
YES
A ← TIME AT WHICH DETERMINATION OF "STOPPED" IS STARTED
S106
A≧T+y
S107
NO
YES
CURRENT TIME ≧ T+y
S108
NO
YES
t^est ← A
S109
REQUEST AND PRESENT DELIVERY INFORMATION
S110
ACQUIRE MOTION SENSOR INFORMATION
S111
DOES MOTION SENSOR INFORMATION INDICATE "STEOPPED"?
S112
NO
YES
DOES MOTION SENSOR INFORMATION INDICATE "BOARDING"?
S113
NO
YES
t^res ← t^est
S114
STORE t^res, T, AND DIFFERENCE d IN DB
S115
STOP MOTION SENSOR
S116
END

ARRIVAL TIME CALCULATING DEVICE

TECHNICAL FIELD

The present disclosure relates to an arrival time calculating device that determines arrival of a user.

BACKGROUND ART

Patent Literature 1 describes a mobile information processing terminal that notifies a user that the user has arrived at a destination when it is determined based on current location information that a current location of the mobile information processing terminal is located at a position at which arrival is scheduled based on a position detection time calculated based on route information.

CITATION LIST

Patent Literature

[Patent Literature 1] Japanese Unexamined Patent Publication No. 2010-141556

SUMMARY OF INVENTION

Technical Problem

However, it may be difficult to accurately acquire a current location of a mobile terminal. For example, a mobile terminal may be set such that the mobile terminal does not always acquire position information in view of privacy protection. In this case, the mobile terminal may not accurately acquire a current location. There is also a problem with a positioning resolution in a mobile terminal. For example, a mobile terminal may not collect position information of coordinate levels and may collect only rough information indicating whether it is located in a predetermined range. When a mobile terminal performs positioning using the GPS, an error of several tens of meters may occur in general.

Therefore, in order to solve the aforementioned problem, an objective of the present disclosure is to provide an arrival time calculating device that can accurately calculate a time of arrival at a destination.

Solution to Problem

An arrival time calculating device according to the present disclosure includes: a user motion determining unit contigured to determine a user motion based on motion sensor information of a user terminal; and an estimated arrival time calculating unit configured to calculate an estimated arrival time as a time at which the user terminal has arrived at a destination based on a position of the user terminal and the user motion, wherein the estimated arrival time is determined based on a result arrival time at which the user terminal has actually arrived at the destination in the past.

Advantageous Effects of Invention

According to the present disclosure, it is possible to accurately calculate an arrival time of a user.

BRIEF DESCRIPTION OF DRAWINGS

FIG. 3 is a diagram illustrating a specific example of a user DB 106.

FIG. 4 is a flowchart illustrating operations of the mobile terminal 100 according to the present disclosure.

DESCRIPTION OF EMBODIMENTS

An embodiment of the present disclosure will be described below with reference to the accompanying drawings. As much as possible, the same elements will be referred to by the same reference signs and repeated description thereof will be omitted.

Figure 1:
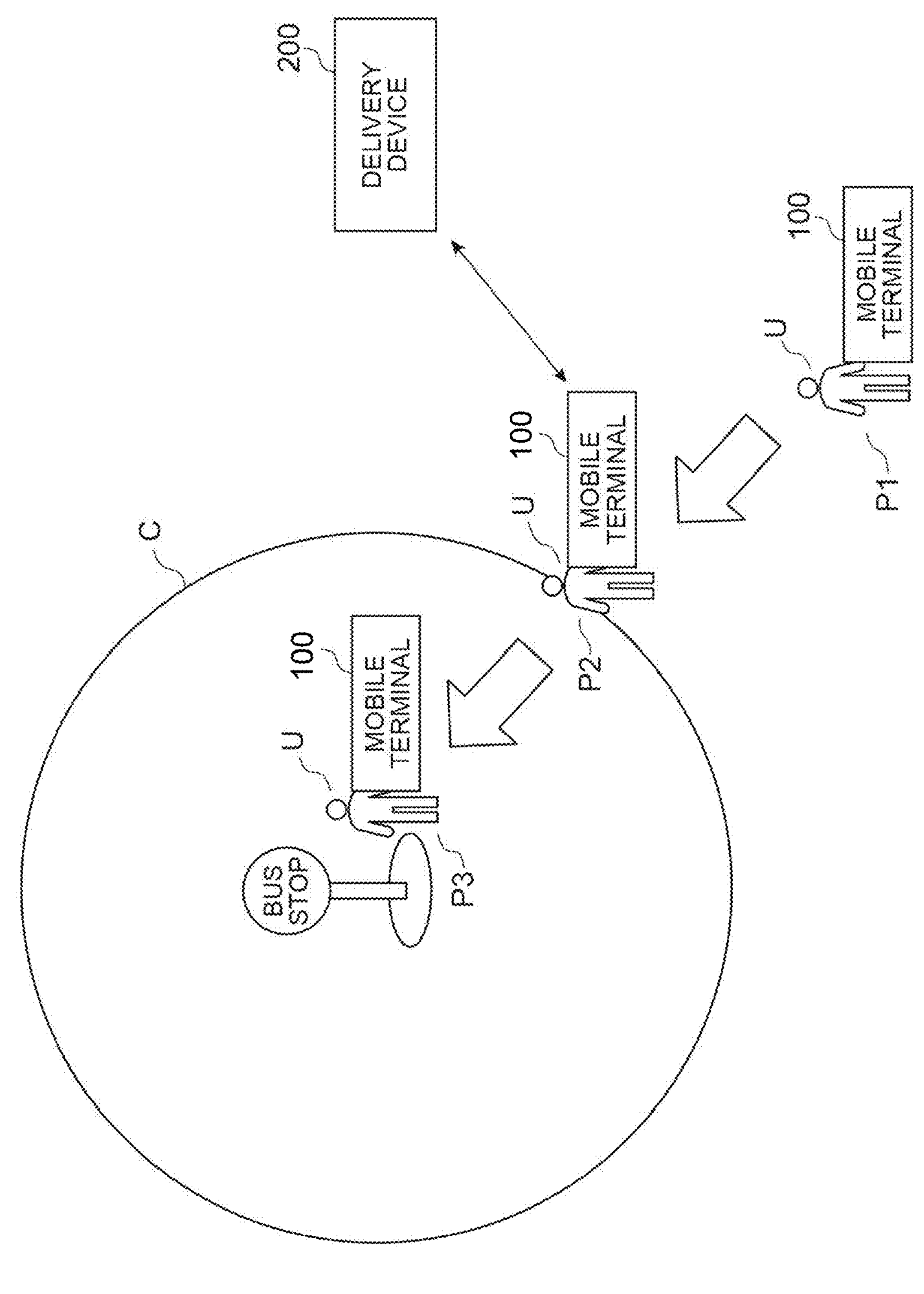
FIG. 1 is a diagram schematically illustrating a situation in which a user U carrying a mobile terminal 100 according to the present disclosure is moving to a station of a bus (a bus stop).

FIG. 1 is a diagram schematically illustrating a situation in which a user U carrying a mobile terminal 100 according to the present disclosure is moving to a station of a bus (a bus stop). As illustrated in the drawing, the user U moves from a position P1 to a station at a position P3. A check-in range C is a range representing a so-called geofence and indicates a virtual area. The mobile terminal 100 stores the check-in range C and can recognize entrance into and exit from the range.

In the present disclosure, a station which is a destination is stored in advance in the mobile terminal 100. The check-in range C is defined by a predetermined radius centered on the station. The example illustrated in FIG. 1 is a simple example, and the destination and the check-in range C may be defined using other methods.

The mobile terminal 100 carried by the user U determines whether the mobile terminal 100 has checked in in the check-in range C based on measured position information. That is, the mobile terminal 100 determines whether the mobile terminal 100 is located at a position P2 which is a boundary of the check-in range C.

The mobile terminal 100 determines whether the mobile terminal 100 has entered the check-in range C based on position information.

When the mobile terminal 100 arrives at the check-in range C, the mobile terminal 100 starts a motion sensor and then determines a user status indicating whether the user U has arrived at the station (a stopped state) or has boarded a bus (a moving state) based on motion sensor information (a sensor value) from the motion sensor.

Figure 2:
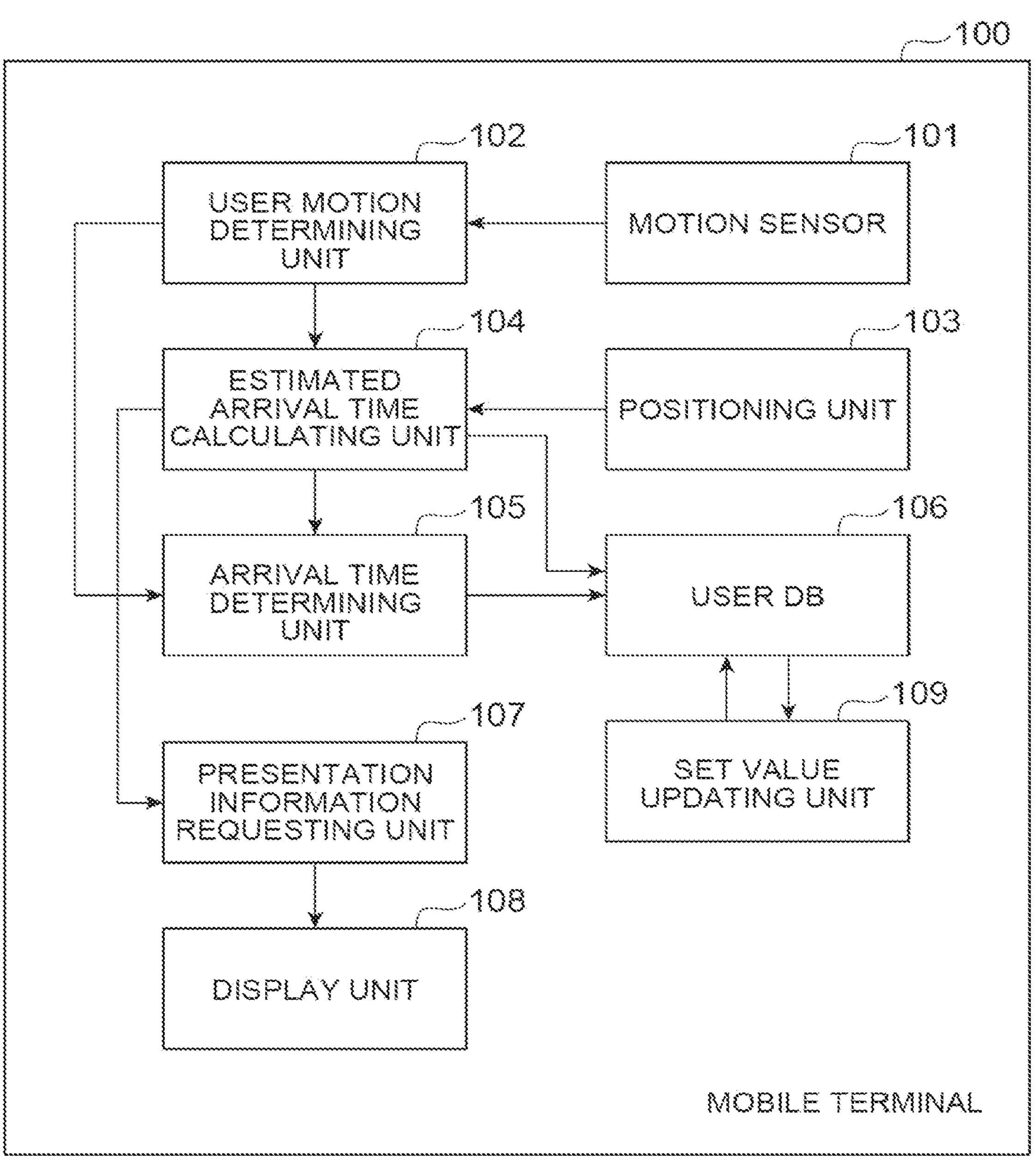
FIG. 2 is a block diagram illustrating a functional configuration of a mobile terminal 100 serving as an arrival time calculating device according to the present disclosure.

FIG. 2 is a block diagram illustrating a functional configuration of the mobile terminal 100 serving as an arrival time calculating device according to the present disclosure. As illustrated in the drawing, the mobile terminal 100 includes a motion sensor 101, a user motion determining unit 102, a positioning unit 103, an estimated arrival time calculating unit 104, an arrival time determining unit 105, a user DB 106, a presentation information requesting unit 107, a display unit 108, and a set value updating unit 109.

The motion sensor 101 is an acceleration sensor, a gyro sensor, a sensor which is a combination thereof, or the like and is a part that outputs motion information (a sensor value) indicating acceleration, an angular velocity, or the like applied to the mobile terminal 100.

The user motion determining unit 102 is a part that determines a user motion based on motion information detected by the motion sensor 101 of the mobile terminal 100. For example, the user motion determining unit 102 estimates whether the user is moving, stopped, or aboard a bus based on the motion information (for example, acceleration or an angular velocity). The user motion determining unit 102 can estimate a motion other than the aforementioned user motions and can estimate, for example, motions of the user who is riding a bicycle or who is running.

The estimated arrival time calculating unit 104 is a part that calculates an estimated arrival time $t^{est}$ at which the user has arrived at the station which is a destination based on position information measured by the positioning unit 103. More specifically, first, the estimated arrival time calculating unit 104 determines whether the user enters a predetermined check-in range C based on the position information and a positioning time. When the position information indicates that the user enters the check-in range C, the positioning time is calculated as a check-in time T.

When the user motion determining unit 102 determines that the user motion is in a stopped state, the estimated arrival time calculating unit 104 determines time A as the estimated arrival time $t^{est}$ based on whether time A at which the user motion is determined to be in the stopped state is greater than the check-in time T+the set value y. Details will be described later.

When the user motion determining unit 102 determines that the user motion is in a boarding state after the estimated arrival time $t^{est}$ has been calculated, the arrival time determining unit 105 determines the estimated arrival time $t_{est}$ as a result arrival time $t^{res}$.

The user DB 106 is a database in which the check-in time T, the result arrival time $t^{res}$, and a difference d therebetween are stored. The user DB 106 receives and stores the check-in time T and the estimated arrival time $t^{est}$ from the estimated arrival time calculating unit 104 and the result arrival time $t^{res}$ from the arrival time determining unit 105. The arrival time determining unit 105 calculates a difference d indicating the difference between the check-in time T and the result arrival time $t^{res}$ and stores the calculated difference d in the user DB 106.

FIG. 3 is a diagram illustrating a specific example of the user DB 106. FIG. 3(*a*) illustrates history data of the check-in time T, the estimated arrival time $t^{est}$, the result arrival time $t^{res}$, and the difference d calculated therefrom of each user. FIG. 3(*b*) is a database that stores the set value y for each user. The set value y is periodically updated using the difference d.

As illustrated in FIG. 3(*a*), the user DB 106 stores a user ID, the check-in time T, the difference d, the estimated arrival time $t^{est}$, and the result arrival time $t^{res}$ in correlation. The difference d is a value obtained by subtracting the check-in time T from the result arrival time $t^{res}$. As illustrated in FIG. 3(*b*), the set value y is correlated with a user. The set value y is a value obtained from the difference d in the history data.

The set value updating unit 109 is a part that updates the set value y in the user DB 104 (FIG. 3(*b*)) based on the history data of the difference d calculated from the check-in time T and the result arrival time $t^{res}$ (FIG. 3(*a*)). Details of this process will be described later.

The presentation information requesting unit 107 is a part that determines content corresponding to time A or a current time when a time obtained by adding the set value y to the check-in time T satisfies a predetermined condition. For example, the presentation information requesting unit 107 transmits time A or the current time to a delivery device 200 (for example, which has a function of a boarding bus recommendation server). The delivery device 200 estimates a bus which the user is scheduled to board using a time table DB of buses in the station which is a destination and determines recommendation information on whether the user is to board the bus. Then, the delivery device 200 transmits the recommendation information to the mobile terminal 100.

The recommendation on whether the user is to board the bus is, for example, recommendation indicating that boarding of the bus is not recommended and boarding of a next bus is recommended when the bus for the user to board is crowded. When the bus for the user to board is uncrowded and a next bus is crowded, recommendation indicating that the bus for the user to board is recommended may be transmitted.

In addition, the delivery device 200 may determine the content based on a waiting time for the bus. For example, a video is determined based on a length of the waiting time. Content for determining a bus to be recommended to board may be determined.

The display unit 108 is a part that displays the recommendation information or content received in response to a delivery request.

Operations of the mobile terminal 100 having the aforementioned configuration will be described below. FIG. 4 is a flowchart illustrating the operations of the mobile terminal 100 according to the present disclosure. The estimated arrival time calculating unit 104 acquires a check-in time T when the user enters the check-in range C based on the position information measured by the positioning unit 103 (S101). Then, the estimated arrival time calculating unit 104 acquires a set value y from the user DB 106 (S102). The motion sensor 101 is started at the timing at which the user enters the check-in range C (S103), and the motion sensor 101 acquires motion sensor information and detects a user motion (S104).

The user motion determining unit 102 determines whether the user is in a stopped state based on the motion sensor information (S105). Here, when the user is not in the stopped state but in a moving state (S105: NO), it can be determined that the user moves to the station. When the user motion determining unit 102 determines that the user is in the stopped state (S105: YES), the estimated arrival time calculating unit 104 determines the time at which the user has been determined to be in the stopped state as time A (S106). As will be described later, when the user motion changes, time A is reset.

Then, the arrival time determining unit 105 determines whether time A≥check-in time T+set value y is satisfied (S107). Here, when time A≥check-in time T+set value y is satisfied, time A is determined as an estimated arrival time $t^{est}$ and is stored in the user DB 106 (S109).

When time A>check-in time T+set value y is not satisfied (S107: NO), it is determined whether current time≥check-in time T+set value y is satisfied (S108). Here, when current time≥check-in time T+set value y is satisfied, time A is stored as the estimated arrival time $t^{est}$ in the user DB 106

(S109). Otherwise, the operation flow returns to S104, acquisition of motion sensor information is performed, and these processes are repeated.

When the estimated arrival time $t^{est}$ is calculated, the presentation information requesting unit 107 transmits a delivery request including the estimated arrival time $t^{est}$ to the delivery device 200, receives recommendation information from the delivery device 200, and presents the recommendation information to the user (S110).

Thereafter, the motion sensor 101 performs a process of acquiring motion sensor information (S111), and the user motion determining unit 102 determines whether the motion sensor information indicates that the user motion is in the stopped state (S112). When it is determined that the user motion is in the stopped state, the processes of S111 and S112 are repeatedly performed. When it is determined that the user motion is not in the stopped state (S112: NO), the user motion determining unit 102 additionally determines whether the motion sensor information indicates that the user is in a bus (S113).

When it is determined that the user motion is in the boarding state, the arrival time determining unit 105 determines the estimated arrival time $t^{est}$ in the user DB 106 as a result arrival time $t^{res}$ (S114). The arrival time determining unit 105 registers the result arrival time $t^{res}$, the check-in time T, and a difference d therebetween in the user DB 106 in correlation with a user ID (S115). The difference d is information for updating the set value y. Then, the motion sensor 101 stops its operation (S116).

As described above, the mobile terminal 100 transmits the delivery request to the delivery device 200 when time A has been acquired or has reached the current time. This time A or current time is based on the premise that it is later than check-in time T+set value y, and the delivery request is transmitted at an appropriate timing according to propriety of the set value y. Recommendation information indicating boarding of the bus is recommended can be transmitted at this timing.

Figure 5:
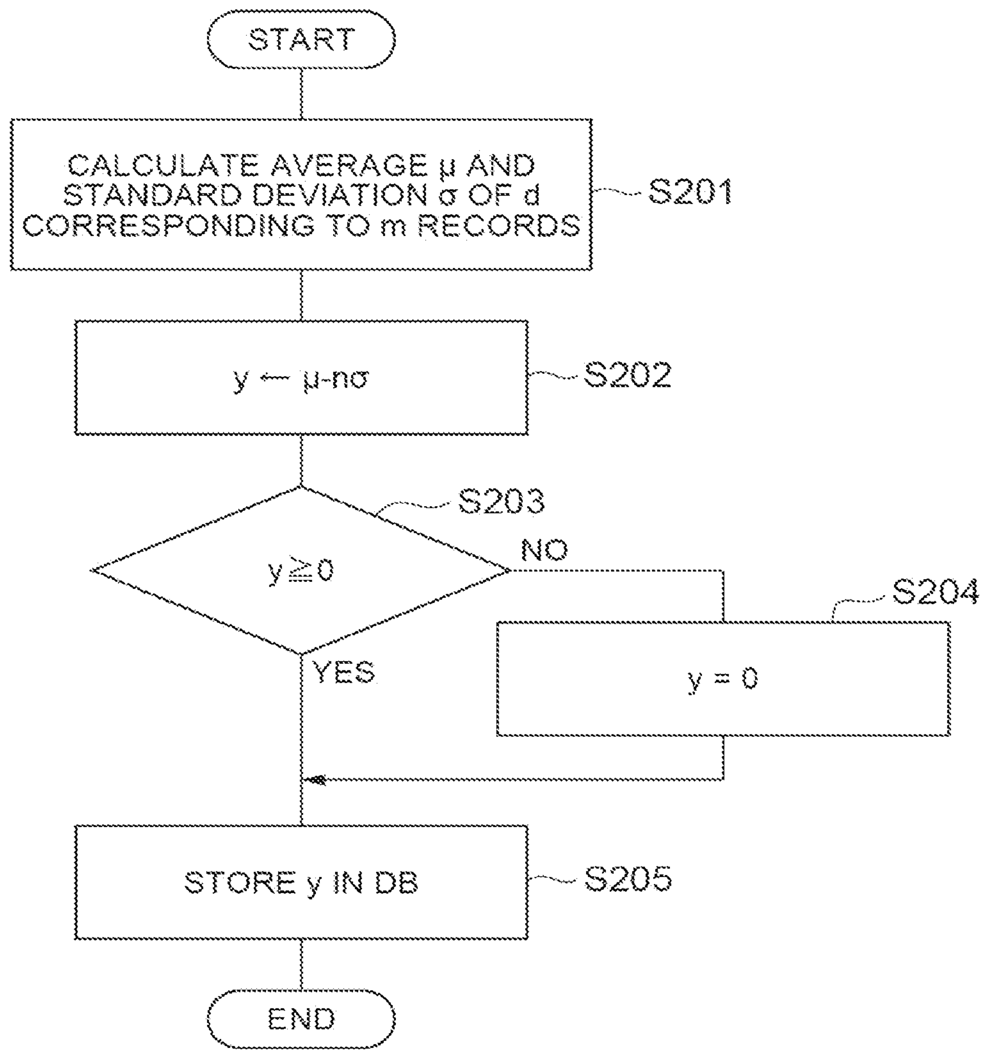
FIG. 5 is a flowchart illustrating a process of updating a set value y.

Update of the set value y will be described below. FIG. 5 is a flowchart illustrating a process of updating the set value y. The set value updating unit 109 takes the differences d corresponding to m records for each user with reference to the user DB 106 and calculates an average value μ and a standard deviation σ thereof (S201). The average $\mu - n\sigma$ is calculated and is assumed to be the set value y of the corresponding user (S202). Here, n is a tuning parameter. In the present disclosure, the set value y is calculated by subtracting a degree of dispersion from the average value. Fine adjustment can be performed using the tuning parameter at that time.

The set value updating unit 109 determines whether set value $y \geq 0$ is satisfied (S203). Here, when set value $y \geq 0$ is satisfied, the last set value y in the user DB 106 is updated using this set value y (S205). When set value $y \geq 0$ is not satisfied, the set value y is set to 0 (S204), and the last set value y in the user DB 106 is updated using the set value y=0 (S205).

In this way, by periodically updating the set value y based on the history, an appropriate set value y can be calculated. The set value y is used to determine whether the user arrives at a destination such as a bus stop, and it is possible to accurately determine arrival at the destination depending on whether the value is appropriate.

Figure 6:
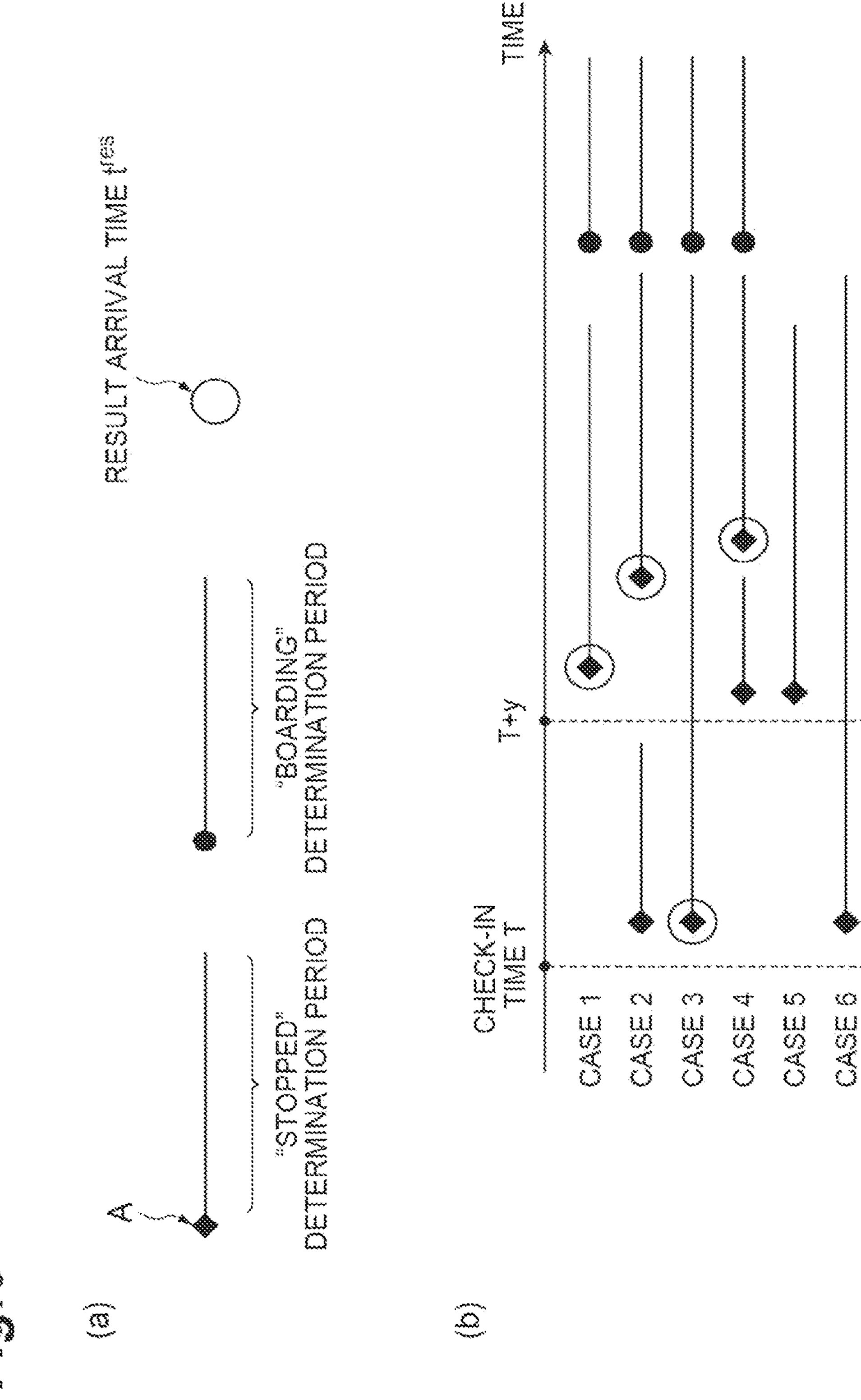
FIG. 6 is a diagram illustrating use cases.

Use cases will be described below FIG. 6(*a*) is a diagram illustrating meanings of symbols illustrated in FIG. 6(*b*), and FIG. 6(*b*) is a diagram schematically illustrating arrival statuses of a user at a destination in Cases 1 to 7.

Case 1 is a case in which the mobile terminal 100 determines that the user is stopped after check-in time T+set value y. In Case 1, time A at which it is determined that the user is stopped is later than check-in time T+set value y. Time A is the estimated arrival time $t^{est}$ and the result arrival time $t^{res}$. This is a typical case in which an actual motion of the user and the set value y for estimation work appropriately.

For example, based on the assumption that a check-in range is defined centered on a bus stop, the user checks in and then arrives at the bus stop. When the user arrives at the bus stop, the user enters the stopped state, and time A is acquired. Time A is slightly later than a time which is check-in time T+set value y. In this case, the set value y may be considered to be an appropriate value. The mobile terminal 100 can correctly determine that the user has arrived at the bus stop at a time point at which time A has been acquired, and transmits a delivery request at that timing.

Case 2 is a case in which whether the user is stopped is determined and time A is acquired after the user has entered the check-in range. Thereafter, at a timing later than check-in time T+set value y, time A is acquired again. Thereafter, the same process as in Case 1 is performed, and time A is acquired and stored as the result arrival time $t^{res}$.

Case 2 indicates an example in which the user temporarily stops due to a red traffic signal or the like until the user reaches the bus stop after having entered the check-in range. Then, the user starts walking again, determination of whether the user is in the stopped state can be started at a timing later than check-in time T+set value y, and time A is acquired.

Case 3 is a case in which the mobile terminal 100 determines that the user is in the stopped state between the check-in time T and check-in time T+set value y and time A is acquired. Until current time>check-in time T+set value y is satisfied, the process of acquiring time A is repeatedly performed. In the drawing, time A is acquired only one time. In Case 3, the user continues to be stopped later than check-in time T+set value y, and then the same process as in Case 1 is performed.

When time A is acquired again and current time>check-in time T+set value y is satisfied, time A acquired again is acquired as the estimated arrival time $t^{est}$.

Case 3 indicates an example in which the user walks fast or runs. That is, the user arrives at the bus stop earlier than check-in time T+set value y. In this case, the user acquires time A retroactively at a time point at which current time>check-in time T+set value y is satisfied. Time A becomes the result arrival time $t^{res}$ as a result and is used to update the set value y. Recommendation is performed based on the time point at which current time>check-in time T+set value y is satisfied.

Case 4 is a case in which time A is acquired two times later than check-in time T+set value y. In Case 4, time A having been acquired later is acquired as the result arrival time $t^{res}$ Thereafter, the same process as in Case 1 is performed.

Case 4 indicates an example in which, later than check-in time T+set value y, the user temporarily stops due to a red traffic signal or the like (time A is acquired) until reaching a destination, walks again, and stops again (time A is acquired again) at a time point at which the user reaches the bus stop.

Case 5 indicates an example which is the same as Case 1 and in which the user does not board a bus. In this case, time A is not registered as the result arrival time $t^{res}$ in the user DB 106.

Case 6 is a case in which time A is acquired earlier than check-in time T+set value y and timeout is taken without recognizing whether the user boards a bus. In this case, time A is not registered as the result arrival time $t^{res}$ in the user DB 106.

Case 7 is a case in which it is determined whether the user has boarded a bus without determining whether the user stops.

Case 7 indicates an example in which the user runs and boards a bus. In this case, time A is not acquired and thus the result arrival time $t^{res}$ is not acquired.

Operations and advantages of the mobile terminal 100 according to the present disclosure will be described below. The mobile terminal 100 includes at least the user motion determining unit 102 and the estimated arrival time calculating unit 104. The user motion determining unit 102 determines a user motion (a stopped state or a boarding state) based on motion sensor information of the mobile terminal 100. The estimated arrival time calculating unit 104 calculates a time (time A) at which the mobile terminal 100 has arrived at a destination as an estimated arrival time $t^{est}$ based on the position of the mobile terminal 100 and the user motion (in the stopped state). The estimated arrival time $t^{est}$ is determined based on a result arrival time $t^{res}$ at which the user actually arrived at the destination in the past.

With the mobile terminal 100, it is possible to accurately acquire a time at which a user has arrived at a destination based on the position information, the user motion, and the result arrival time $t^{res}$ in the past.

The estimated arrival time calculating unit 104 calculates the estimated arrival time based on a positioning time (the check-in time T) at which the mobile terminal 100 has performed positioning in a check-in range C centered on a destination (for example, a bus stop) and a state determination time (time A) at which the user motion has been determined to be in a predetermined state (for example, the stopped state).

For example, the estimated arrival time calculating unit 104 calculates the state determination time (time A) as the estimated arrival time $t^{est}$ by comparing the state determination time (time A) with a reference time (check-in time T+set value y) obtained by adding a predetermined set value y to the positioning time (the check-in time T).

With this configuration, by comparing the reference time using the set value y with time A when the user motion enters a predetermined state such as the stopped state, it is possible to acquire an accurate arrival time.

In the present disclosure, the arrival time determining unit 105 determines the estimated arrival time $t^{est}$ as the result arrival time $t^{res}$ when the user motion has changed.

That is, the user motion determining unit 102 determines that the user motion is in the stopped state, the estimated arrival time calculating unit 104 calculates a time at which the user motion entered the stopped state as the estimated arrival time $t^{est}$, and the arrival time determining unit 105 determines the estimated arrival time $t^{est}$ as the result arrival time $t^{res}$ when the user motion has changed from the stopped state to a vehicle-boarding state. The result arrival time $t^{res}$ is used for a next or subsequent process.

For example, when the user motion changes from the stopped state to the bus-boarding state, the estimated arrival time $t^{est}$ becomes the result arrival time $t^{res}$. When the user has changed from the stopped state to the bus-boarding state, it means that the user is located at the bus stop at the estimated arrival time $t^{est}$.

In the present disclosure, the estimated arrival time calculating unit 104 determines the state determination time A as the estimated arrival time $t^{est}$ when the user motion is continued in the predetermined state and the current time passes the reference time (check-in time T+set value y) before the state determination time A passes the reference time.

This corresponds to Case 3. This is because the user performed an irregular motion, but it is possible to accurately determine the arrival time of the user. By using this in the set value y, it is possible to calculate a more accurate set value y and thus to determine propriety of time A.

The mobile terminal 100 according to the present disclosure includes the user DB 106 in which the positioning time (the check-in time T) at which positioning has been performed when the mobile terminal 100 has entered the predetermined range centered on the destination, the estimated arrival time $t^{est}$ (at the time of check-in), and the result arrival time $t^{res}$ are stored as history information, and the set value updating unit 109 updates the set value y based on the history information. The user DB 106 may be provided in the mobile terminal 100 or may be provided in an external server.

The set value updating unit 109 updates the set value y based on a difference d between the result arrival time $t^{res}$ and the check-in time T and a degree of dispersion thereof. Accordingly, the set value y can be set to an appropriate value.

In the present disclosure, time A is determined to be appropriate based on the set value y. The mobile terminal 100 can determine that the user has arrived at the destination based on time A. That is, when the user motion determining unit 102 determines that the user motion enters the predetermined state (for example, the stopped state) after the mobile terminal 100 has entered the check-in range C, the presentation information requesting unit 107 (a processing unit) performs a process of determining recommendation information based on the check-in time (the positioning time) and the set value y. For example, a delivery request is transmitted.

At this time, the mobile terminal 100 transmits the delivery request including time A or the current time to the delivery device 200, and the delivery device 200 determines delivery information based on time A or the current time and transmits the delivery information to the mobile terminal 300.

For example, a bus which the user is to board is estimated based on time A and a time table of buses. In recommendation information, boarding of a bus may be recommended, or other details may be included. For example, when the bus is crowded, recommendation information indicating that boarding of a next bus is recommended may be determined and transmitted.

In the present disclosure, the mobile terminal 100 serves as an arrival time estimating device, but the present disclosure is not limited thereto. The mobile terminal 100 may include a motion sensor and a positioning unit, and a management server cooperating with the mobile terminal 100 may perform determination of the user motion, calculation of an estimated arrival time, determination of a result arrival time, and the like.

Figure 7:
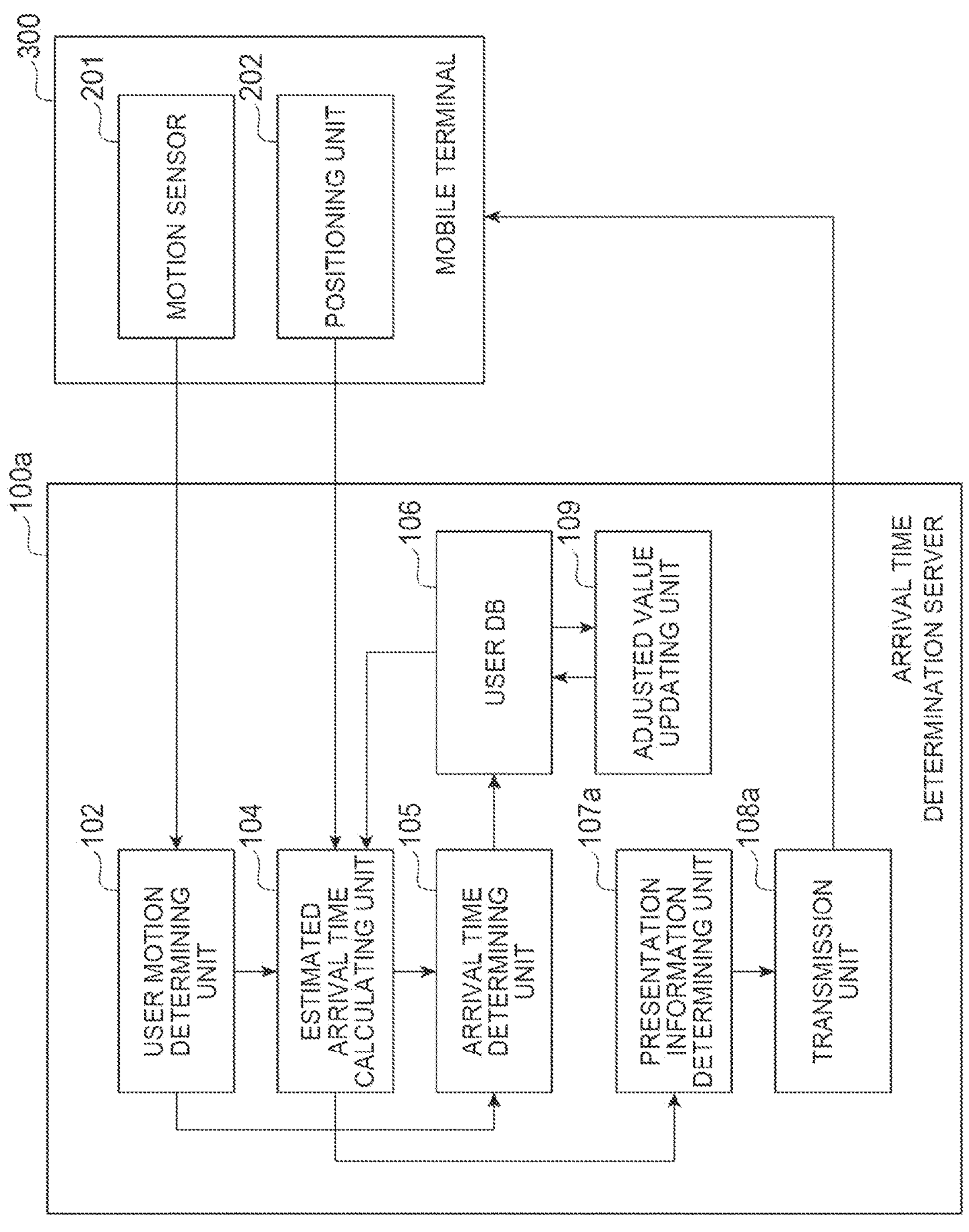
FIG. 7 is a diagram illustrating a functional configuration of an arrival time determination server 100*a* according to a modified example.

FIG. 7 is a diagram illustrating a functional configuration of an arrival time determination server 100*a* according to a modified example. As illustrated in the drawing, the arrival time determination server 100*a* includes a user motion determining unit 102, an estimated arrival time calculating unit 104, an arrival time determining unit 105, a user DB 106, a set value updating unit 109, a presentation information determining unit 107*a*, and a transmission unit 108*a*. The arrival time determination server 100*a* can determine a user motion and determine an arrival time in cooperation with the mobile terminal 300.

The arrival time determination server 100*a* receives the motion sensor information and the position information from the mobile terminal 300 to perform the aforementioned processes.

In the arrival time determination server 100*a*, the presentation information determining unit 107*a* determines presentation information based on time A when time A is acquired, and the transmission unit 108*a* transmits the presentation information to the mobile terminal 300.

The user DB 106 in the present disclosure and the modified example is provided in the mobile terminal 100 and the arrival time determination server 100*a*, but the present disclosure is not limited thereto. The user DB 106 may be provided in another server or the like, and the set value y may be taken at the time of determination of time A or the like, and the process of updating the set value y may be periodically performed.

In the present disclosure and the modified example, an arrival time at which a user arrives at a bus stop, but the present disclosure is not limited thereto and can be applied to railroad stations, airports, and the like.

In the present disclosure, a bust stop or a railroad station at which a user boards a bus or a train may be registered in advance, or may be estimated from position information histories in the past, and the estimated stop or station may be registered.

A sensor which is provided as a standard in advance may be used as the motion sensor 101 of the mobile terminal 100 and the motion sensor 201 of the mobile terminal 300, or information corresponding to motion sensor information may be estimated using another means instead of using the sensor. For example, the same function as the motion sensor can be realized using a means for clustering a user state by combining an inertial sensor and a digital filter.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 8:
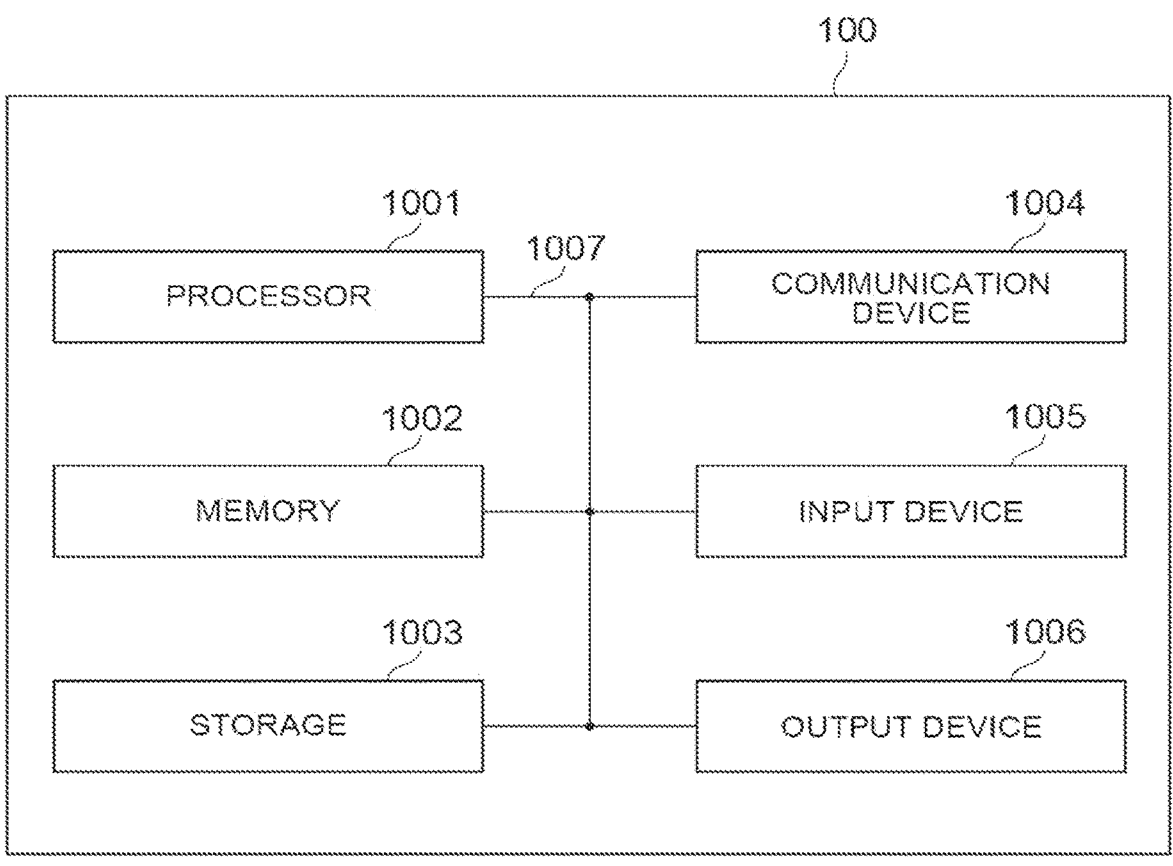
FIG. 8 is a diagram illustrating an example of a hardware configuration of a mobile terminal 100 or an arrival time determination server 100*a* according to an embodiment of the present disclosure.

For example, the mobile terminal 100, the arrival time determination server 100*a* and the like according to one embodiment of the present disclosure may function as a computer that performs processing of an arrival time determination method according to the present disclosure. FIG. 8 is a view showing an example of the hardware configuration of the mobile terminal 100 according to one embodiment of the present disclosure. The mobile terminal 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the mobile terminal 100 may be configured to include one or a plurality of the devices shown in the drawings or may be configured without including some of those devices.

The functions of the mobile terminal 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the user motion determining unit 102, the estimated arrival time calculating unit 104, and the arrival time determining unit 105 and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the estimated arrival time calculating unit 104 of the mobile terminal may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing the arrival time determination according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including at least one of the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example. For example, the above-described presentation information requesting unit 107 may be implemented by the communication device 1004.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the mobile terminal 100 or the arrival time determination server **100*a* may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001** may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning. For example, at least one of a channel and a symbol may be a signal (signaling). Further, a signal may be a message. Furthermore, a component carrier (CC) may be called a cell, a frequency carrier, or the like.

Further, information, parameters and the like described in the present disclosure may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present disclosure in some cases. Because various channels (e.g., PUCCH, PDCCH etc.) and information elements (e.g., TPC etc.) can be identified by every appropriate names, various names assigned to such various channels and information elements are not definitive in any way.

In the present disclosure, the terms such as "Mobile Station (MS)" "user terminal", "User Equipment (UE)" and "terminal" can be used to be compatible with each other.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

When the terms such as "first" and "second" are used in the present disclosure, any reference to the element does not limit the amount or order of the elements in general. Those terms can be used in the present disclosure as a convenient way to distinguish between two or more elements. Thus, reference to the first and second elements does not mean that only two elements can be adopted or the first element needs to precede the second element in a certain form.

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner.

REFERENCE SIGNS LIST

101 Motion sensor
102 User motion determining unit
103 Positioning unit
104 Estimated arrival time calculating unit
105 Arrival time determining unit
106 User DB
107 Presentation information requesting unit
108 Display unit
109 Set value updating unit
200 Delivery device
201 Motion sensor

The invention claimed is:

1. A mobile terminal comprising:

a motion sensor;

a positioning device configured to measure a position of the mobile terminal and to determine that the mobile terminal is positioned within a predetermined range set based on a destination;

a communication device;

a display; and a memory storing history data including, for each of a plurality of past occurrences for a destination, a result arrival time and at which the mobile terminal was positioned within the predetermined range; and processing circuitry configured to determine a user motion based on motion sensor information from the motion sensor; and calculate an estimated arrival time as a time at which the mobile terminal has arrived at a destination based on a position of the mobile terminal and the user motion, wherein a setting value is obtained from the memory based on a history of differences, for respective occurrences, between the result arrival time and a first positioning-entry time; and wherein the processing circuitry is configured to:

in response to the positioning device determining that the mobile terminal is positioned within the predetermined range, determine a second positioning-entry time as a check-in time and start the motion sensor;

acquire a state determination time at which it started determining, based on the motion sensor information, that the user motion is in a predetermined state;

calculate a reference time by adding the second positioning-entry time and the setting value, and compare the reference time with the state determination time; and when the state determination time is on or after the reference time, or when the predetermined state continues until the reference time is reached, determine the state determination time as the estimated arrival time at which the mobile terminal has arrived at the destination;

when a change of the user motion from the predetermined state to a vehicle-boarding state is detected, determine the estimated arrival time as a result arrival time, store the result arrival time and the second positioning-entry time as a new record in the memory, and stop the motion sensor; and cause the communication device to transmit, based on the estimated arrival time, a delivery request to an external delivery device, receive recommendation information from the external delivery device, and cause the display to present the recommendation information, wherein the recommendation information is determined based on a waiting time derived, from a timetable database at the destination, using the estimated arrival time.

2. The mobile terminal according to claim 1, wherein the processing circuitry determines that the user motion is in a stopped state, calculates a time at which the user motion entered the stopped state as the estimated arrival time, and determines the estimated arrival time as the result arrival time when the user motion has changed from the stopped state to a vehicle-boarding state.

3. The mobile terminal according to claim 2, wherein the processing circuitry determines the state determination time as the estimated arrival time when the user motion is continued in the predetermined state and a current time passes the reference time before the state determination time passes the reference time.

4. The mobile terminal according to claim 1, wherein the processing circuitry is configured to update the setting value based on the history data.

5. The mobile terminal according to claim 4, wherein the processing circuitry updates the setting value based on differences between the result arrival time and the second positioning-entry time and a degree of dispersion of the differences.

* * * * *